US009321129B2

(12) United States Patent
Siewert et al.

(10) Patent No.: US 9,321,129 B2
(45) Date of Patent: Apr. 26, 2016

(54) MACHINE AND METHOD FOR THE MATERIAL PROCESSING OF WORKPIECES BY WAY OF A LASER BEAM

(71) Applicants: Andreas Siewert, Castrop-Rauxel (DE); Manfred Barz, Bendorf (DE); Jörg Thieme, Altdorf (DE); Artjom Fuchs, Freudenberg (DE); Ingo Schramm, Birken-Honigsessen (DE)

(72) Inventors: Andreas Siewert, Castrop-Rauxel (DE); Manfred Barz, Bendorf (DE); Jörg Thieme, Altdorf (DE); Artjom Fuchs, Freudenberg (DE); Ingo Schramm, Birken-Honigsessen (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 173 days.

(21) Appl. No.: 14/027,852

(22) Filed: Sep. 16, 2013

(65) Prior Publication Data

US 2014/0209585 A1    Jul. 31, 2014

(51) Int. Cl.
*B23K 26/00* (2014.01)
*B23K 26/02* (2014.01)
*B23K 26/12* (2014.01)
*B23K 26/08* (2014.01)

(52) U.S. Cl.
CPC ........... *B23K 26/127* (2013.01); *B23K 26/0884* (2013.01); *B23K 26/706* (2015.10)

(58) Field of Classification Search
CPC ............ B23K 26/0884; B23K 26/127–26/128; B23K 26/0096; B23K 26/023; B23K 26/425
USPC ......................................... 219/121.6–121.86
See application file for complete search history.

(56) References Cited

U.S. PATENT DOCUMENTS

| 4,367,017 A * | 1/1983 | Jimbou et al. ............. 359/226.1 |
| 4,752,668 A * | 6/1988 | Rosenfield et al. ...... 219/121.68 |
| 5,061,839 A * | 10/1991 | Matsuno et al. ......... 219/121.83 |
| 8,829,889 B2 * | 9/2014 | Hannweber et al. ............ 324/96 |
| 2008/0112447 A1 * | 5/2008 | Wilhelmi et al. .......... 372/38.09 |

* cited by examiner

*Primary Examiner* — Sang Y Paik
(74) *Attorney, Agent, or Firm* — Timothy J. King, Esq.; Yuri Kateshov, Esq.

(57) ABSTRACT

The invention relates to a machine for material processing with a laser beam, in particular laser welding. It is comprised of a machine guided protective housing with an outlet opening surrounding the laser beam that is pointed at the material during processing.

To create a machine for laser beam welding which ensures improved operator and personal safety without completely enclosing the machine, it is suggested that the protective housing contains at least one sensor which measures certain chemical or physical properties. The sensor is connected to the machines control unit which compares the current values with reference values for a measure and, depending on current/reference value comparison, interrupts the laser beam or prevents laser beam activation. In addition a method and arrangement for improved operator and personal safety for operation of such a machine is presented.

11 Claims, 6 Drawing Sheets

MACHINE AND METHOD FOR THE MATERIAL PROCESSING OF WORKPIECES BY WAY OF A LASER BEAM

BACKGROUND OF THE DISCLOSURE

1. Field of the Invention

The invention relates to a machine for material processing with a laser beam comprising of a machine controlled protective housing with an outlet opening which surrounds a laser beam during processing of at least one component. This invention also relates to a method of material processing by laser beam with such a machine.

2. Background of the Disclosure

Modern high performance lasers are used for material processing in industrial manufacturing. Especially laser welding is becoming more and more important. Laser welding is used in welding of components that are welded at high speeds, have small weld joints and must have low thermal deformation. Laser welding is performed without the use of a weld metal. To maintain processing flexibility when guiding the laser to a component the machine for laser welding usually consists of a laser source and a guidance system. The guidance systems contains a flexible fiber optics (LWL) with which the laser is guided from the laser source to the processing head, which contains an opening for the laser beam. The processing head is mounted to a multi-axle industrial robotic arm. The beam source, however, for example a solid state laser, is preferably arranged stationary.

Laser equipment bears a substantial risk of health hazards. The concentrated electromagnetic radiation can cause biological harm to the equipment operators. If laser beams or their scattered radiation hit the skin or cornea the operators may, depending on the lasers wavelength, experience burns and/or tissue damage. Strict safety regulations apply to all laser equipment due to the potential hazard. According to these regulations laser equipment is categorized in various classes. Laser welding equipment used for automotive production must have the lowest risk potential, where the accessible laser radiation has to be nonhazardous (Class 1). According to the safety regulations the protective housing of the laser equipment is the part of the equipment with the purpose of preventing additional radiation which would exceed the limit of the accessible radiation.

To avoid health hazards during use of laser welding equipment the entire machines were previously enclosed in protective walls, usually made of metal. Such enclosure meets the safety regulations, though the full enclosure of the welding equipment hinders the equipment integration into continuous production processes of the automotive industry.

From the DE 20 2007 012 255 U1 a full enclosure of a machine for processing of components via laser beam is known, where the enclosure is double-walled. A transmitter/receiver unit monitors the hollow space between the enclosure walls. If laser radiation enters the hollow space, the receiving elements actuate triggering the safety circuit for the laser system.

The DE 10 2006 053 579 A1 also describes a completely enclosed laser processing facility with active laser protection walls. The active laser protection walls not only passively prevent penetration of the laser radiation, but also deactivate the laser beam immediately after laser radiation hits the protective wall. The laser protection foil arranged in front of the laser protection wall in the radiation direction undergoes a detectable change when struck by laser and at least one sensor connected to the laser by a threshold switch deactivates the laser when a detector signal exceeds the threshold value.

The DE 100 59 246 A1 shows a hand-guided laser-processing unit with a protective housing having an outlet opening, which surrounds the laser beam directed onto a workpiece during the material processing. The inside of the protective housing is impermeable to light due to attaching the equipment to the component to be processed. A light sensitive sensor ensures that the laser beam is only active as long as the inner part of the enclosure is sealed by the component.

The EP 2 149 421 A1 shows laser welding equipment to be used in a continuous production process in the automotive industry, where the laser source is connected via an optical fiber to the focusing optic. The focusing optic is mounted on a machine-guided protective housing with exit slit for the laser beam. The laser beam which is used during welding of at least one component can only radiate through the exit slit of the protective housing. To improve operator safety the laser source can only be activated when the exit opening of the protective housing sits upon one of the work pieces. This laser welding equipment can be integrated into the infrastructure of common resistance welding lines used in the automotive industry.

Despite the proposed measures in EP 2 149 421 A1 to improve operator safety, the Class 1 safety regulations for laser equipment cannot be satisfied in all operative circumstances. Equipment wear of the pressure area of the protective housing can cause uncontrolled discharge of laser radiation from the laser exit area of the housing. The protective housing can also be damaged by direct or indirect laser radiation to a degree that there may be uncontrolled discharge of radiation directly from the enclosure. Damage of this severity may be caused, for example, by a defective connection between optical fiber and focusing optics in the machine guided protective housing. Damage may be also caused by uncontrolled reflections of laser beams both from the inside as well as the outside of the protective housing.

Based on the state of technology this invention has the goal to create equipment for material processing, in particular processed by laser welding, which provides improved safety of operators, without full enclosure of the equipment, when the protective housing is damaged, especially due to wear and tear. In addition this document will also specify a method and arrangement for improving personal safety during operation of this equipment.

This objective is achieved with a machine to process materials as described above by adding at least one sensor to the protective housing. This sensor detects certain chemical and/or physical properties as a measure and is connected to a control unit which compares the actual value to the reference value of the measure and, depending on the actual/reference comparison, interrupts the laser beam or prevents laser activation. And when at least one of the sensors is a resistance sensor, the change in the electrical resistance due to a damage of the protective housing (8) is detected.

The resistance sensor detects a change in the electrical resistance due to a damage of the protective housing. The outlet opening of the protective housing is usually arranged on a tapered pressure piece which is inside the enclosure. Damages to the protective enclosure appear primarily in the area of the heavily used pressure piece which is pressed against the component at every welding operation. The resistance sensor is preferably located on this pressure piece. The wire of the resistance sensor, for example integrated in the wall of the pressure piece, preferably surrounds the pressure piece with at least one loop. Should the wire, particularly if arranged within 10-15 mm of the exit opening, be destroyed after damage to the pressure piece, the electrical resistance within the sensor changes. This change can be captured in a circuit in which the resistance sensor is integrated. Arrangement of the resistance sensor in the immediate proximity of the outlet opening has the additional benefit that damages to the pressure piece caused by wear are also registered. In case equipment wear causes parts of the pressure piece to break away, the relatively thin wire will break, which changes the electrical resistance. By guiding the resistance wire along the crossover of the pressure piece to the remaining enclosure one can also detect the event of a complete disconnection of the pressure piece from the enclosure.

In advantageous design of this invention the resistance sensor is part of the already existing safety circuit which allows activation of the laser source only when the outlet opening of the protective housing makes contact with the material. Such a safety circuit is shown in EP 2 149 421 A1, and explicitly included in this application. The safety circuit contains a switch element which may be, for example, mounted on the protective housing and turns on the laser source when the outlet opening makes contact with the material. When the resistance sensor is looped into this safety circuit and the pressure piece is damaged, the activation of the energy supply, independent of the position of the switch element, cannot occur.

To optimally integrate a machine for laser welding into the production environment, a high degree of flexibility is required, especially for machine controlled protective enclosure devices mounted on a robot arm. Mounting of the resistance sensor as well as possibly additional sensors on the machine controlled protective housing allows this flexibility. Mounting of sensors and monitoring of measurements in the area of the constantly moving, multi axle protective housing during operation would not be practical.

A single-wall protective housing could contain a sensor, if applicable, preferably on the inside of the protective enclosure, for example mounted to the inner surface of the enclosure or the focusing optics. Provided the protective housing is already of the double-wall type to increase safety an additional sensor can be mounted in the hollow space between the outer and inner walls. If the protective housing features additional sensors besides resistance sensor, at least one sensor can be mounted within the hollow space and at least one sensor to the inside of the enclosure.

The sensors measure actual values of chemical or physical measures on the inside of the protective housing or inside the hollow space between the protective walls of the enclosure. These measured values change in case of damage in the area of the outlet opening for the laser beam or damage to the walls of the protective enclosure. A control unit constantly compares the actual values to the reference values and interrupts the laser beam or prevents laser activation depending on the actual/reference value comparison. The interruption or prevention of laser beam activation can be achieved with the help of electrical switches which disconnect the laser source from the power supply. Another option is to interrupt the laser beam itself. This can be achieved through a filter element or a beam lock which is inserted right behind the focusing optic on the beam path.

In one embodiment of the invention the equipment for material processing contains at least one sensor for electromagnetic radiation in addition to the resistance sensor. The sensor is mounted on the inside of the protective housing or within the hollow space between the double walls of the enclosure. Should the damage to the enclosure walls permit ambient light into the enclosure, the level of the sensor will change. The level change is registered by the equipment controls and, depending on the degree of the change, interrupts the laser beam or, in case the laser was not active, prevents activation of the laser. Wear damage to the pressure piece surrounding the outlet opening of the equipment can also cause ambient light to enter the protective enclosure as the pressure piece has no longer close-fitting contact with the material. This will also be registered by the sensor.

The sensitivity range of the electromagnetic radiation sensor is adjusted to the already existing electromagnetic radiation in the production environment of the laser equipment. The sensor for electromagnetic radiation is preferably unsusceptible to the electromagnetic radiation in the wavelength of the laser. This can be achieved through a filter which is in line prior to the sensor for electromagnetic radiation sensor and thus prevents transmission of radiation in wavelength of the laser to the electromagnetic radiation sensor.

Photo-resistors and photo-diodes are particularly suitable as sensors for electromagnetic radiation.

In addition, or alternatively, damages to the protective housing can also be detected by flow sensors. The protective enclosure must contain an inlet through which a gaseous medium can flow in with a determined volume and an outlet through which the medium can flow out with a second determined volume. Laser welding equipment usually features this in the form of a Cross-Jet or Plasma-Jet to avoid interference of the laser through contamination and particles on the inside of the protective enclosure. The outlet is usually connected to a suction device which extracts the gaseous medium with a defined volume flow. In case of damage to the protective housing part of the medium leaks through the damage, this reduces the measured outlet volume of the gaseous medium. This change in volume is measured by the flow sensor inside the protective enclosure. The flow sensor is mounted in the exhaust area. The sensor can also be attached to a tube connecting the outlet with the suction device. In addition the inlet for the gaseous medium can be constantly monitored by a flow sensor for possible volume variations to be taken into account by the control system for the interruption/prevention of the laser beam.

To determine the volume stream at the inlet or outlet the flow sensor can measure the rate of flow of the gaseous medium and determine the throughput by product of cross-sectional area and the measured rate of flow. The rate of flow can be measured for example with a hydrometric vane. In addition magnetic inductive flow sensors and ultrasound flow sensors should be considered. An important advantage of ultrasound flow sensors is the fact that measuring is largely unaffected by the properties of the gaseous medium. In addition, the ultrasound flow sensor does not have any moving parts and therefore has low maintenance costs, which is especially advantageous for the use of the equipment in the automotive production industry.

Another embodiment of the invention features at least one pressure sensor in addition to the resistance sensor mounted to the protective housing which measures a change in the pressure and/or the existing pressure within the hollow space of the protective enclosure.

In a certain operating situation of the machine-operated protective housing, for example when the outlet opening has close-fitting connection with the material to be welded, there is a defined pressure on the inside of the protective enclosure. In case of damage to the walls of the enclosure or wear of the pressure piece with outlet opening the change in pressure is registered by the control unit and the laser beam is interrupted.

If the pressure variations within the hollow space of a double wall protective housing are measured, damages in the walls of the enclosure can be reliably detected. However, wear of the protective housing in the area of the outlet opening and especially in the pressure piece at the opening cannot be detected by monitoring of the hollow space. For this reason it is recommended to measure the pressure inside of the protective housing as well as in the hollow space between the double walls, if present.

For pressure measuring, for example, piezo-electric and piezo-resistive sensors in particular are considered. Piezo-resistive pressure sensors provide the required sensitivity for this application and are available at low cost. The temperature sensitivity of piezo-resistive sensors can be eliminated by use of a difference-forming electrical circuit.

Another embodiment of the invention features at least one protective housing mounted sound level sensor in addition to the resistance sensor, which measures a change of the sound level inside the protective enclosure. The use of a sound level sensor offers the additional advantage of early detection of defects caused by ambient noise of moving parts, for example the focusing optics.

For recording of sound levels microphones are used. The microphone converts the sound pressure inside the protective housing into a corresponding analog electrical voltage. The control unit evaluates the current and interrupts the laser or prevents laser activation.

Another embodiment of the invention features at least one protective housing mounted chemical sensor in addition to the resistance sensor, which measures changes within chemical composition of gases within the protective enclosure and/or the double wall hollow space. In case of damage to the wall of the protective enclosure outside air flows into the enclosure or the wall hollow space. This changes the chemical composition of the gases which is recognized by the chemical sensor. The control unit, depending on the change in the chemical composition of the gases, will interrupt/prevent the activation of the laser.

The chemical sensor is a gas sensor that converts information about the surrounding gas into an electrical signal that can be processed by the control unit. Gas sensors that are chemo-resistive are considered. The ambient gas directly influences the conductivity of a gas sensitive sensor surface. The change in resistance is used as a measure. For example, inorganic metal oxide semiconductors (Mox) or a conductive polymer are considered as gas sensitive surfaces. Alternatively the sensor can work on capacitive principles. A gas sensitive dielectric changes the capacity of a condenser. The change in capacity is used as a measure.

As a result of the invented methods the protective housing can be mounted on a robot arm and can move like a welding head of a standard resistance welding gun to the material to be welded, without the laser welding equipment posing a health hazard to operators or persons in the area of the equipment.

An advantageous arrangement for increased operator and personal safety, especially in laser welding, incorporates a laser source for laser welding and a laser guiding system from the laser source to a focusing optic, housed in a protective enclosure of a machine for material processing according to one or more of the Claims 1 to 10.

The laser source is preferably a Fiber Laser. Fiber Lasers have high electro-optical efficiency, excellent beam quality, long durability, and a compact, maintenance free and sturdy construction, which is why they are particularly suitable for the intended application.

A glass fiber with at least one doped core is the active medium. Fiber Lasers are commonly optically pumped, parallel to the fiber core radiation coupled into the casing or the core directly. The pumping radiation comes preferably from a setup that contains multiple single-mode Fiber Lasers. For the purpose of this high performance application Ytterbium and Neodymium are used as doping material.

After leaving the doped core the laser beam reaches the beam guiding system, primarily a fiber glass optical waveguide, which guides the beam to a focusing optic.

SPECIFIC DESCRIPTION

Figure 1:
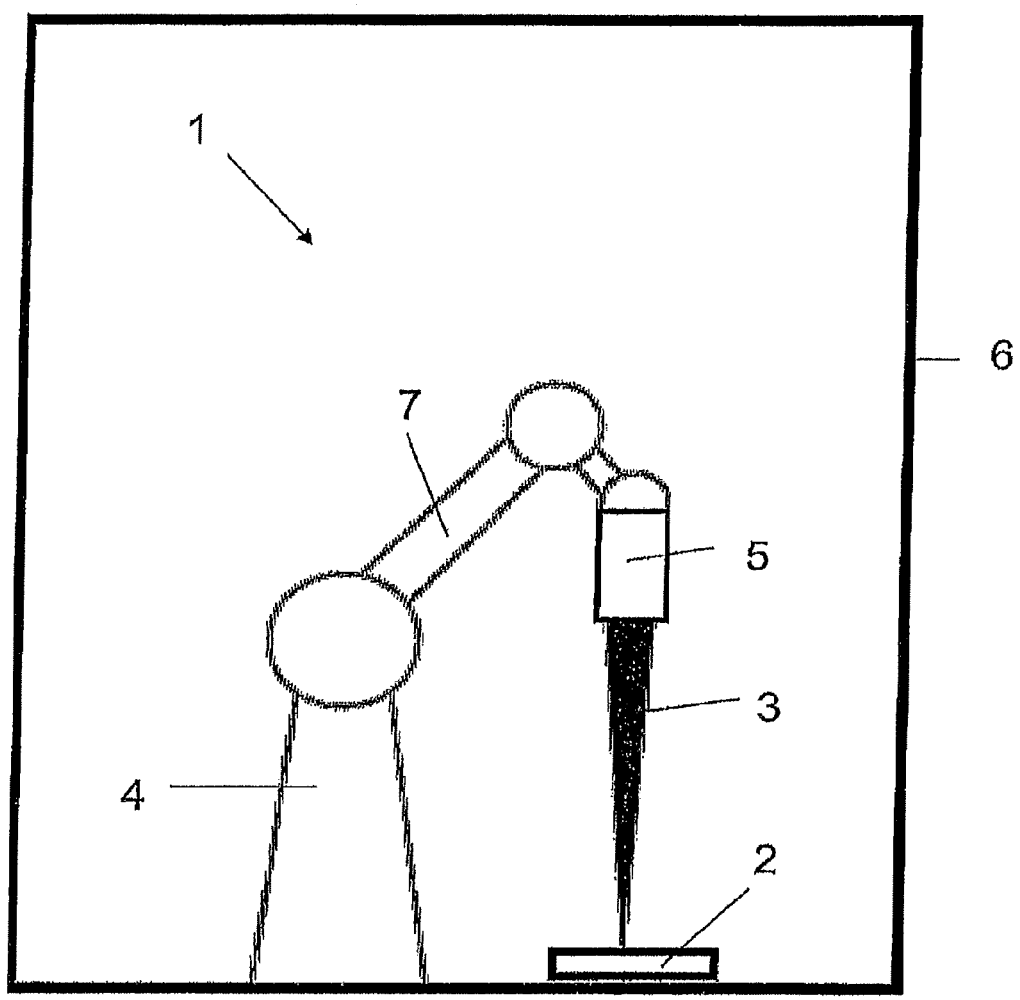
FIG. 1 a state-of-the-art machine for laser beam welding in a protective enclosure FIG. 2a a first example of the invented machine for laser beam welding containing a sensor for electromagnetic radiation during normal operation FIG. 2b the machine in FIG. 2a with an electromagnetic radiation sensor during interrupted operation FIG. 3a a second example of the invented machine for laser beam welding containing a flow sensor during normal operation FIG. 3b the machine in FIG. 3a with a flow sensor during interrupted operation FIG. 4a a third example of the invented machine for laser beam welding containing a pressure sensor during normal operation FIG. 4b the machine in FIG. 4a with a pressure sensor during interrupted operation FIG. 5 illustration of a protective housing of the invented machine for laser beam welding with double-wall enclosure FIG. 6 illustration of a protective housing of the invented machine for laser beam welding with resistance sensor.

FIG. 1 shows the principal setup of a machine (1) for processing of material (2) with a laser beam (3) of a high-performance laser. A robot (4) with robot arm allows the operator flexible guidance of the laser beam to the material (2). The laser energy is guided with help of an optical waveguide (not shown) to the processing head (5) where the laser beam (3) emerges. To establish the required laser safety the entire laser processing machine is contained in a protective enclosure (6) which prevents laser radiation from exiting the protective enclosure.

The invented machine (1) for laser beam welding shown in FIGS. 2-4 contains a robot (4) with robot arm (7), and a robot guided protective housing (8) mounted at its end. The protective enclosure has an outlet opening (9) on the front end opposite the mounting point on the robot arm (7). The outlet opening (9) surrounds the laser beam (3) which is pointed on the material (2) during processing. Provided the machine (1) for laser welding is used in the automotive industry, the outlet opening (9) of the protective housing (8) is arranged on the tapered pressure piece (21) which is surrounded by the protective housing (8) (see FIG. 6).

Compared to the rest of the protective housing (8) the pressure piece (21) with the outlet opening (9) is tapered and has a close-fitting connection with the material (2).

Figure 2A:
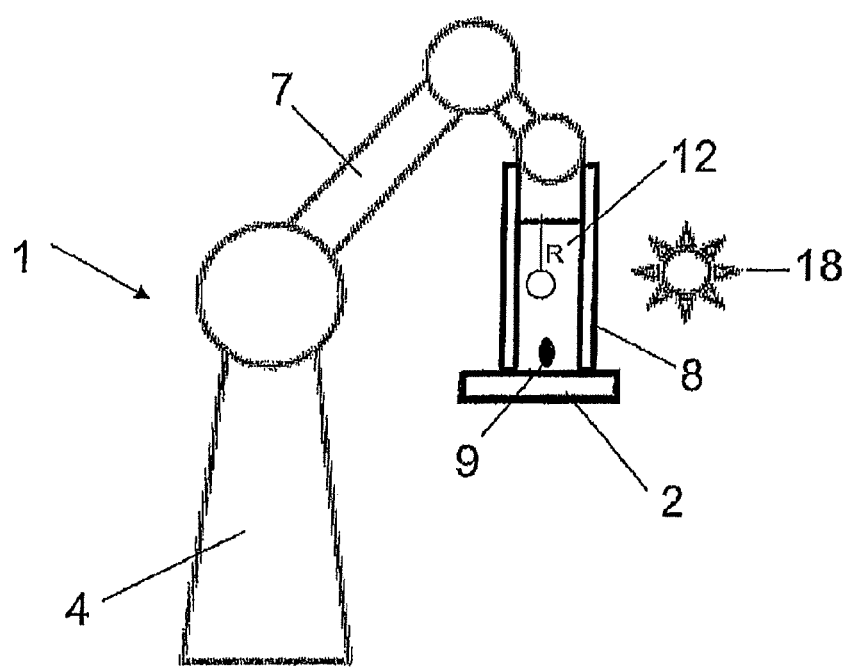
Figure 2B:
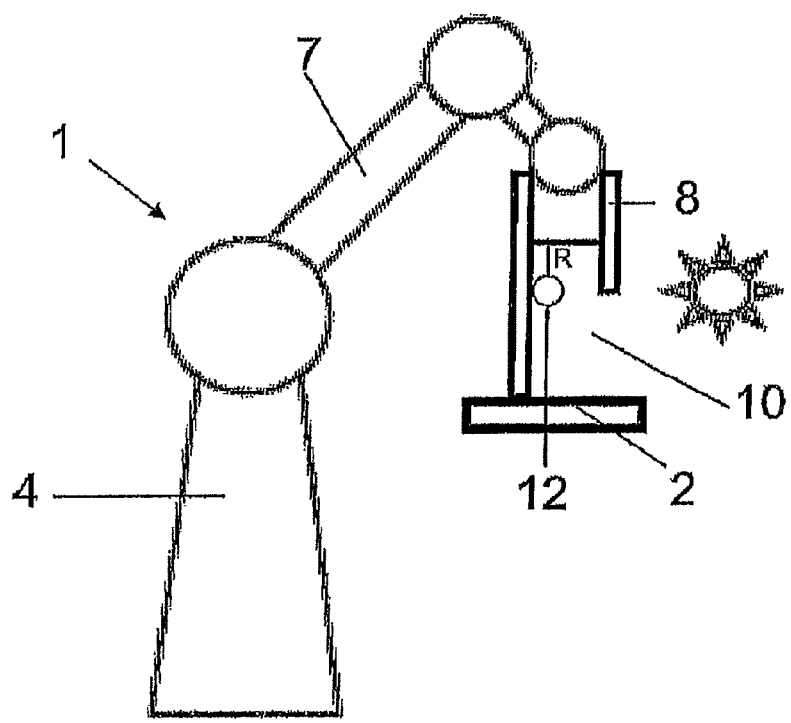
Figure 3A:
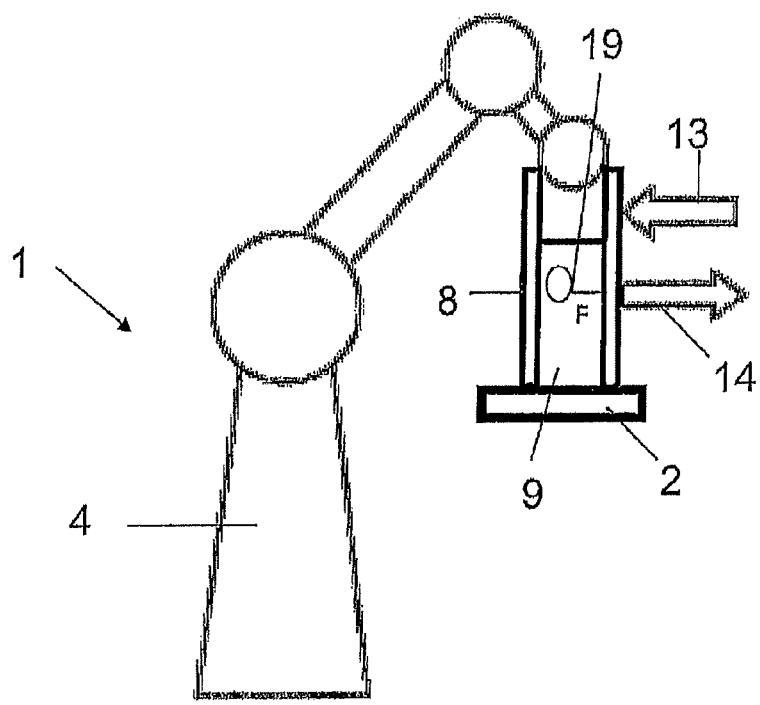
Figure 3B:
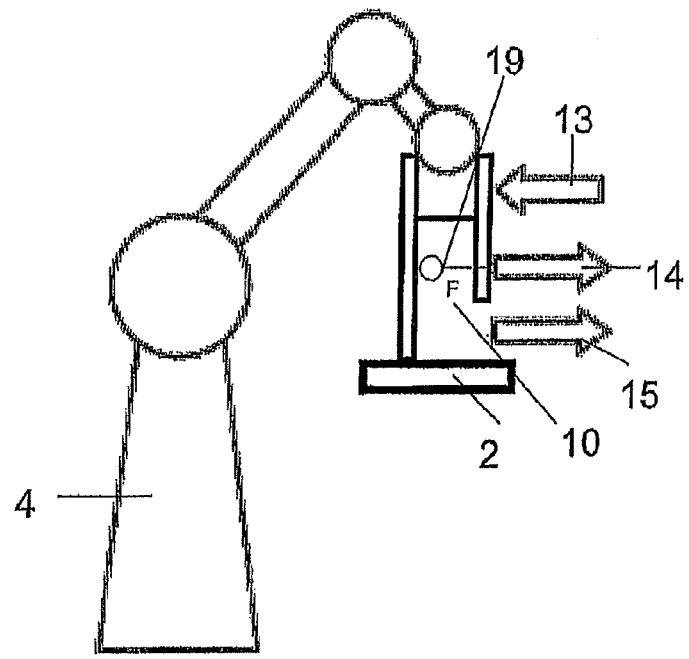
Figure 4A:
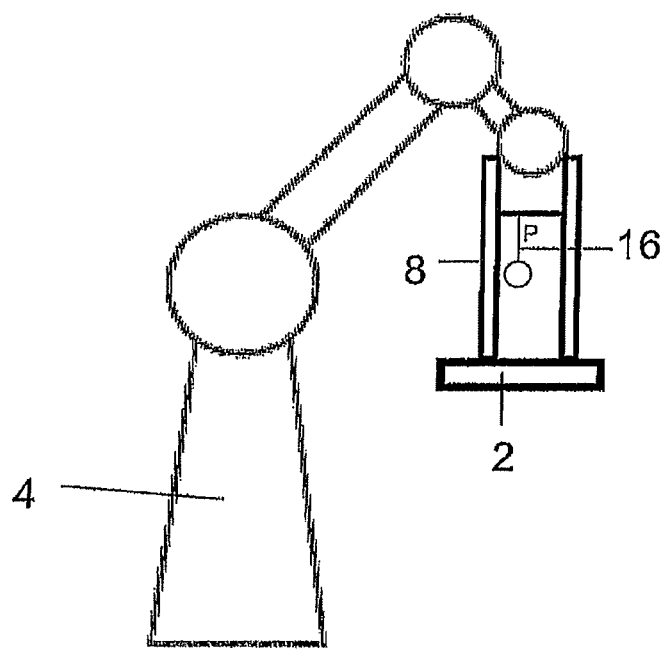
Figure 4B:
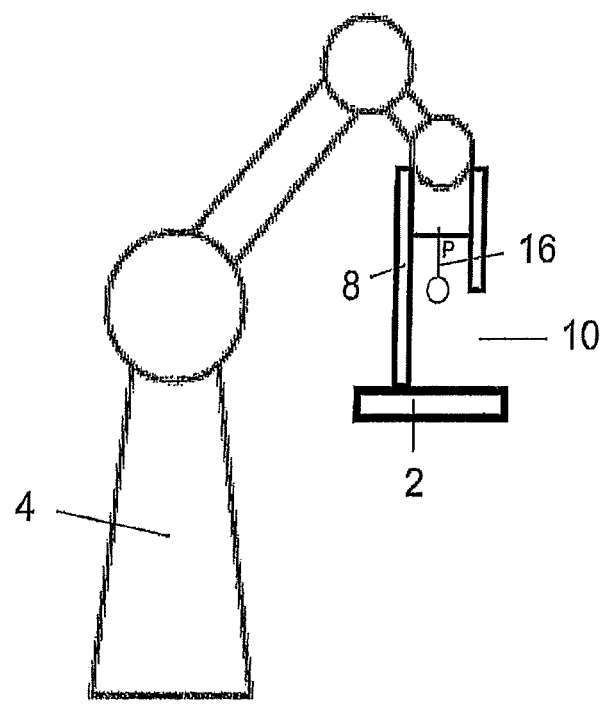

The outlet opening is slit-shaped. The laser beam can only be activated if the outlet opening (9) connects tightly to the material. To achieve this, a switch element can be mounted on the protective enclosure (9) which activates the power supply once the outlet opening slit is connected with the component. This document refers to EP 2 149 421 A1, the information contained therein is explicitly included in this application. FIGS. 2a, 3a and 4a show the invented machine (1) with a fully functional protective housing (8) resting on the material (2). FIGS. 2b, 3b and 4b show the invented machine (1) with a schematically shown damage (10) in the area of the wall of the protective housing (8).

Figure 6:
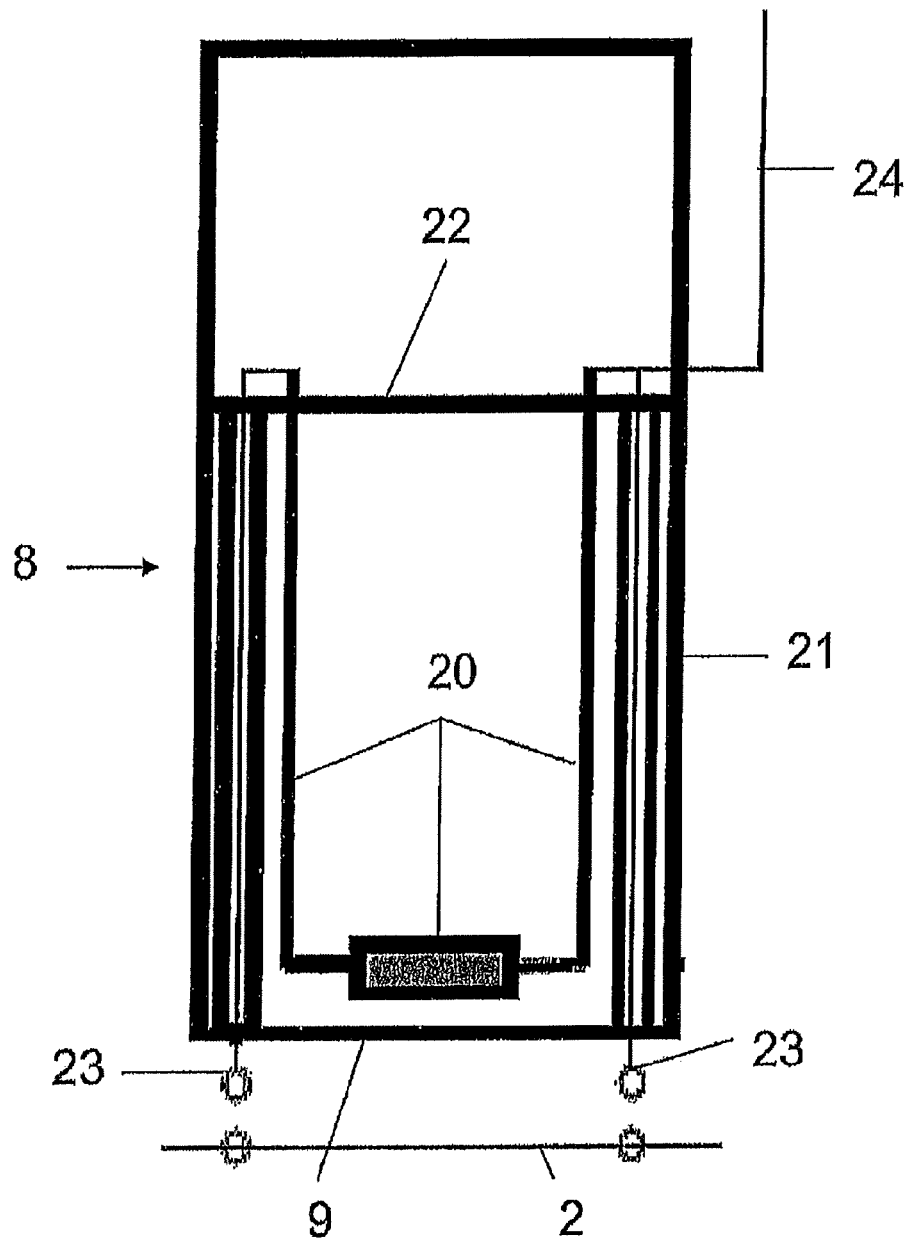

FIG. 6 shows the protective housing (8) of the machine (1) for laser beam welding and a mounted resistance sensor (20) which registers variations in the electric resistance caused by a damaged protective housing (8). In the examples shown in FIGS. 2-4 the resistance sensor (20) is not shown for the purpose of clarity.

The wire of the resistance sensor (20), for example integrated in the wall of the pressure piece (21), preferably surrounds the pressure piece (21) with at least one loop. To achieve this, for example, the wire can be glued into a notch of the enclosure wall. The distance between the wire loop and the outlet opening (9) is approximately 10-15 mm. The wire can also be attached to the inside wall of the pressure piece. The wire of the resistance sensor (20) is guided along the crossover (22) from the pressure piece (21) to the remaining part of the protective housing (8).

The resistance sensor (20) is part of an already existing safety circuit (24) which allows activation of the laser source only when the outlet opening (9) of the protective housing makes contact with the material (2). The safety circuit (24) is comprised of two switch elements (23) that are mounted on the protective housing (8). These switches, for example key switches, activate the power supply of the beam source when the outlet opening (9) makes contact with the material. The resistance sensor (20) is looped into the key switch circuit. In case of the pressure piece (21) damage and consequent damage to the wire of the resistance sensor (20), the power supply cannot be activated regardless of the switch element (23) position.

Differences in the implementations of the invented machine (1) according to FIGS. 2 to 4 are the result of different sensors mounted on the protective housing (8). These sensors collect certain chemical/physical properties as measurements. A control unit (not shown in the Figures) compares current values registered by the sensors with the respective reference values. Depending on the current/reference value comparison the control unit will interrupt/prevent activation of the laser beam.

Figure 5:
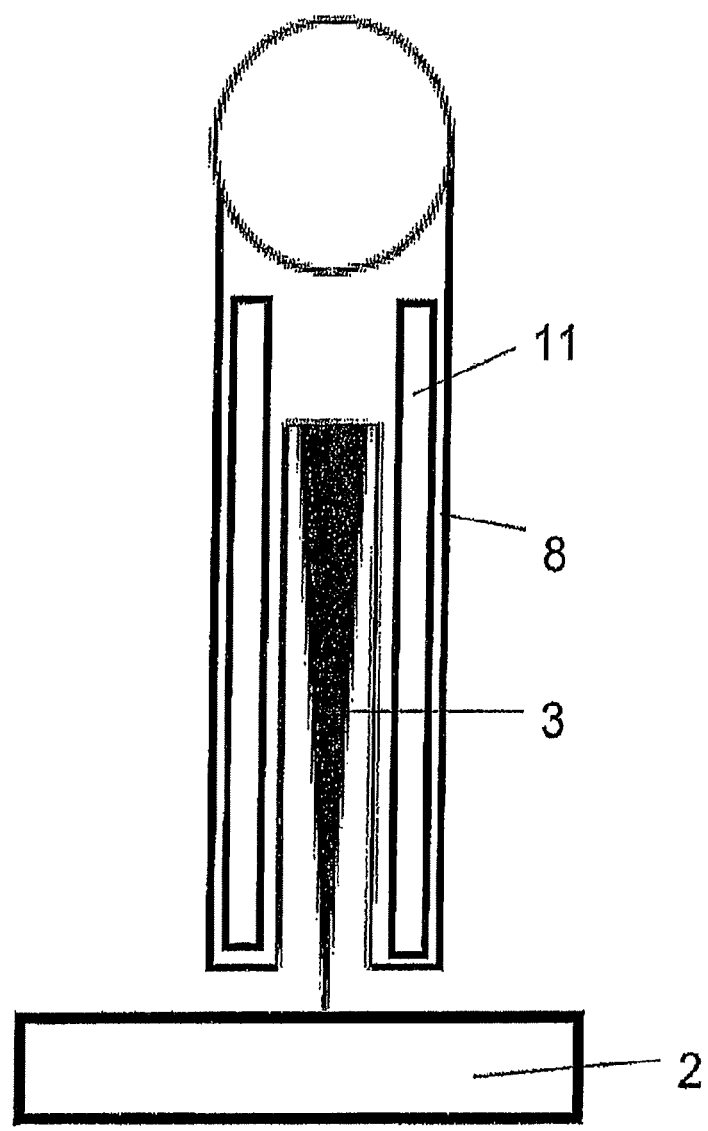

In the implementation examples shown in FIGS. 2-4 the protective housing (8) is formed by a single wall. To increase safety, the protective housing (8) can also, as shown in FIG. 5, be implemented with a double wall. The walls of the protective housing (8) are spaced apart and contain the hollow space (11).

All of the embodiments seen in FIGS. 2-4 described below can be equipped with either single or double wall protective housing (8). Every machine (1), in addition to the resistance sensor (20) shown in the Figure, can have a combination of sensors previously described in FIGS. 2-4. The sensors can be mounted both inside the protective housing (8) and in the hollow space (11) between the enclosure walls, if present.

In the embodiment shown in FIG. 2 the protective housing (8) features a sensor for electromagnetic radiation (12). The sensor (12) may be placed behind a filter that is impermeable to laser radiation (3). This causes the sensor for electromagnetic radiation (12) to react only to the remaining radiation that enters the protective housing (8). This can be electromagnetic radiation from the area surrounding the protective housing which can enter the enclosure through the outlet opening (9) after the enclosure has been removed from the material (2), or electromagnetic radiation that enters the material (2) connected enclosure through damage (10) in the housing (8). To ensure a defined electromagnetic radiation in the working environment outside of the protective housing (8) multiple radiation sources (18) can be mounted in the area of the machine controlled protective housing (8). The electromagnetic radiation wavelength of the radiation sources (18) is preferably tuned to the sensor for electromagnetic radiation (12).

The sensor for electromagnetic radiation (12) measures the electromagnetic radiation which enters the protective housing (8) from the outside. If the control unit recognizes a current/reference value difference outside of the tolerance range caused by damage (10) to the wall of the protective housing, the laser beam (3) will be interrupted.

During normal operation, as soon as the protective housing (8) is lifted from the material (3) electromagnetic radiation will enter the enclosure through the outlet opening (9) and will be recognized by the sensor (12). The radiation entering through the outlet opening will prevent the activation of the laser until the outlet opening has close-fitting connection with the material (2).

The protective housing (8) in FIG. 3 has a flow sensor (19) mounted to it. The flow sensor (19) measures the volume change between the added gaseous medium (13) and the forcibly removed gaseous medium (14). The gaseous medium (13, 14) is added to the protective housing through an inlet (not displayed) and removed from the housing through an outlet (not displayed). If the volume stream changes, for example caused by damage (10) to the housing (8), the change in the volume stream of the gaseous medium is measured by the flow sensor. The damage (10) causes a leakage of the gaseous medium from the protective housing (8) as a leakage flow (15) which causes the flow sensor (19) to register a lower volume of the gaseous medium (14) at the outlet. The deviation of the current values measured by the flow sensor (19) is evaluated by the control unit, and depending on the current/reference value comparison the laser will be interrupted.

In the embodiment shown in FIG. 4 the machine (1) for laser beam welding features a pressure sensor (16) mounted to the protective housing (8). The pressure sensor (16) recognizes changes of the existing pressure inside the protective housing (8). In case of the wall damage (10) of the housing (8) the pressure changes, and the control unit interrupts the laser beam (3).

The basic advantage of the shown measuring setups and measuring methods is the significantly lower cost compared to the full enclosure (6) shown in FIG. 1. Additionally, the machine (1) for material processing, especially laser welding, can be integrated better into continuous production processes.

The invention claimed is:
1. Machine for material processing, comprising
a laser source emitting a laser beam along a path;
a protective housing (8) displaceable between the laser source and material to be laser processed;
at least one sensor (12, 16, 19, 20) in the protective housing to monitor certain physical properties as measurements;
a control unit coupled to the at least one sensor and operative to compare actual measured and reference values and, depending on the comparison, interrupt the laser beam (3) or prevent laser source activation, wherein the at least one sensor (12, 16, 19, 20) is a resistance sensor (20) that detects changes in electrical resistance caused by damage to the protective housing (8),
a hollow pressure piece surrounded by a distal end of the protective housing and displaceable therewith, the hollow pressure piece and distal end being rested on the material during processing to prevent a laser radiation, which traverses the hollow pressure piece, from escap- ing the hollow pressure piece, wherein the at least one sensor is a resistance sensor mounted to the hollow pressure piece.

2. Machine for material processing according to claim 1, wherein the pressure piece is provided with an outlet opening (9).

3. Machine for material processing according to claim 1 further comprising a safety circuit (24) which includes the at least one resistance sensor and is operative to activate the laser source only when an outlet opening (9) of the protective housing (8) has close-fitting connection with the material (2).

4. Machine for material processing according to claim 1 further comprising at least one additional sensor (12, 16, 19) mounted inside the protective housing (8), that measures certain chemical or physical properties in the protective housing.

5. Machine for material processing according to claim 4, wherein the protective housing (8) is double walled with an existing hollow space (11) and where the at least one additional sensor (12, 16, 19) contained in the hollow space (11) measures certain chemical or physical properties inside the hollow space (11).

6. Machine for material processing according to claim 4 wherein the at least one additional sensor (12) is a sensor for electromagnetic radiation which detects outside electromagnetic radiation (R) that enters the protective housing (8).

7. Machine for material processing according to claim 4, the at least one additional sensor is a pressure sensor (16) which measures the pressure changes inside the protective housing (8).

8. Machine for material processing according to claim 4, wherein the at least one additional sensor is a sound level sensor which measures changes in the sound level inside the protective housing (8).

9. Machine for material processing according to claim 4, wherein the at least one additional sensor is a chemical sensor which measures the change in the chemical composition of gases inside the protective housing and/or the hollow space.

10. Machine for material processing according to claim 4, wherein
   the protective housing (8) is configured with an inlet through which a gaseous medium (13) can stream inside the protective housing (8) and
   an outlet through which the gaseous medium (14) can be removed, and
   the at least one additional sensor being a flow sensor (19), measuring the change in flow rate (F) of the added and extracted gaseous medium (13, 14), mounted on the protective housing (8).

11. Machine for material processing of claim 10 further comprising a laser beam waveguide system which guides the laser radiation from the energy source to a focusing optic, arranged in the protective housing.

\* \* \* \* \*